June 2, 1931.  A. MOORE  1,808,713
MANIFOLD FOR SUPPLY OF SUPPLEMENTAL GASES
TO INTERNAL COMBUSTION ENGINES
Filed Feb. 21, 1927
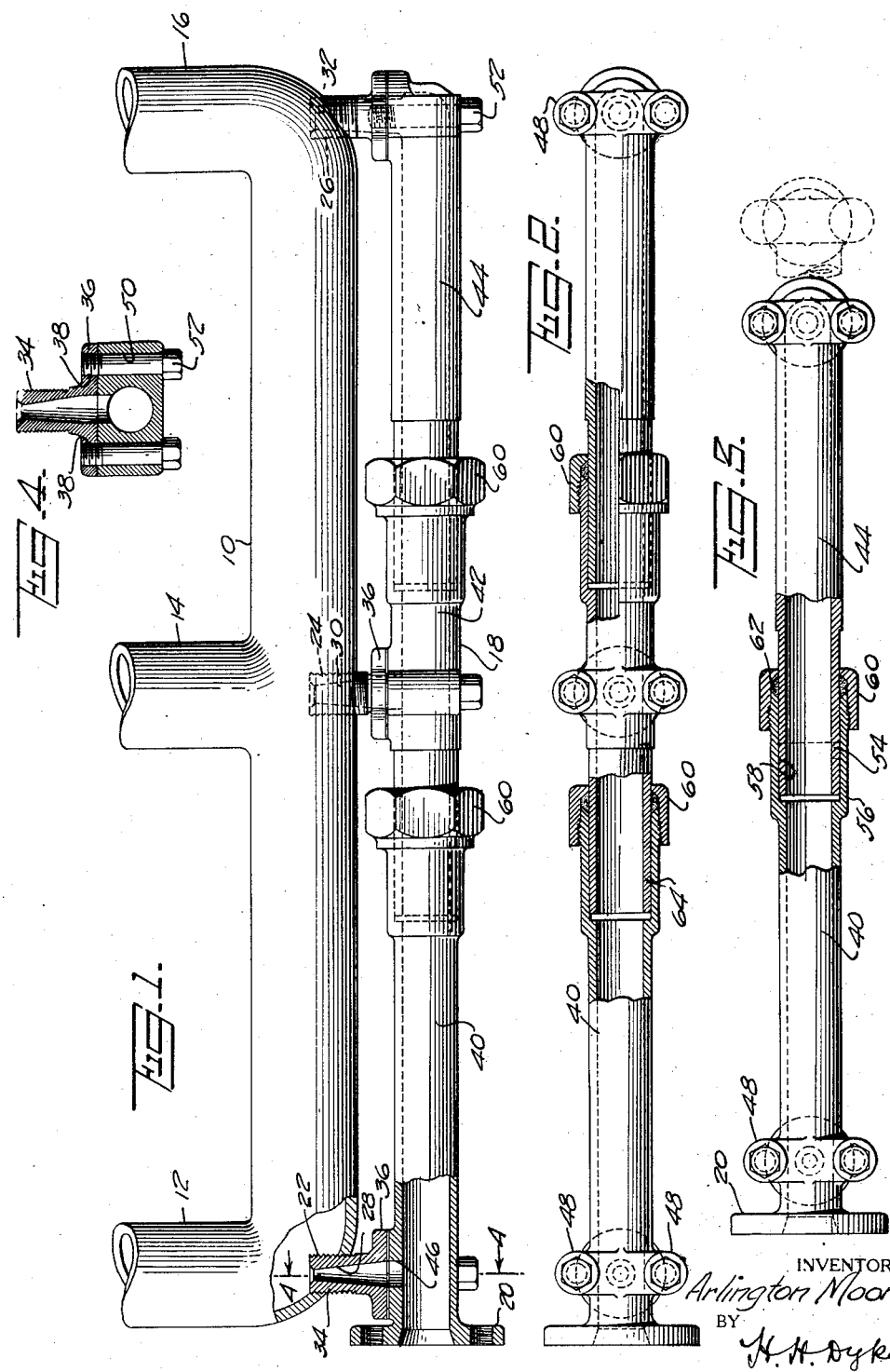
INVENTOR
Arlington Moore
BY
H. H. Dyke
ATTORNEY Patented June 2, 1931

1,808,713

UNITED STATES PATENT OFFICE

ARLINGTON MOORE, OF NEW YORK, N. Y., ASSIGNOR, BY MESNE ASSIGNMENTS, TO MAX-MOOR CORPORATION, OF NEW YORK, N. Y., A CORPORATION OF DELAWARE

MANIFOLD FOR SUPPLY OF SUPPLEMENTAL GASES TO INTERNAL COMBUSTION ENGINES

Application filed February 21, 1927. Serial No. 169,826.

My invention relates to a secondary manifold for supplying and distributing supplemental gases—preferably mixtures of exhaust gas of the engine and air, with or without additional fuel—to the intake manifold leading from the carburetor and throttle of an internal combustion engine to the engine cylinders.

A principal object of the invention is the provision of such a secondary manifold, which is made in parts or sections that are adjustable in relation to one another, and which is of substantially universal application to intake manifolds of various engines and constructions, so that service stations installing my equipment for supplying supplemental charge material as an accessory on old engines need not keep on hand large stocks of secondary manifolds specially constructed to fit each of the large number of engines and manifolds of various makes and sizes, but can meet practically any requirement with a limited number of simple stock parts.

In the accompanying drawings illustrating embodiments of the invention, Fig. 1 is a plan view, partly in section, of an intake manifold for a six cylinder engine and having attached thereto a secondary manifold embodying my invention. Fig. 2 is a side view, partly in section, of the secondary manifold shown in Fig. 1. Fig. 3 is a view similar to Fig. 2 of the secondary manifold assembly with the central section omitted for application to an intake manifold having two main branches, and Fig. 4 is a cross-section on the line 4—4, Fig. 1.

Reference character 10 designates the intake manifold of an internal combustion engine having three main branches 12, 14 and 16 (which in turn subdivide in the usual way to enter the six intake valve ports of a six cylinder engine).

Reference character 18 is applied to indicate generally the secondary manifold.

In the form shown the supplemental charge material comes into the supplemental manifold 18 at one end thereof, and the flange 20 is provided for attachment of a suitable supply conduit.

Delivery of the supplemental charge material is preferably by means of nozzles 22, 24 and 26 arranged to discharge with the stream flow into the intake manifold branches 12, 14 and 16. With the supply of supplemental gases coming in at the end of the secondary manifold, the nozzle openings 28, 30 and 32 preferably increase in size successively as the distance from the source of supply increases, so as to insure getting substantially even distribution to the several branches of the main intake manifold.

The nozzle members, as 22, 24 and 26, preferably comprise a screw-threaded shank 34 and a flange 36 having tapped bolt holes 38 formed therein. Said members are separately screwed into holes drilled and tapped in the intake manifold, a suitable guide being preferably provided in order to insure the parallelism and alignment of the several holes.

The conduit portion of the secondary manifold is made in sections provided with telescoping connection.

These sections, as 40, 42, 44, have the bores thereof in communication with the nozzle openings 28, 30 and 32, by means of openings 46. Adjacent to each opening 46, preferably above and below such opening, the secondary manifold sections, which are preferably cast, are provided with ears 48, having holes 50 therein. Bolts 52 passing through holes 50 and screwed into the tapped holes 38 in the nozzle member flanges 36 serve to connect the manifold sections to the nozzle members. In making up the connection suitable gaskets are preferably used in order to secure a gas-tight connection.

Where the secondary manifold is connected to a four cylinder engine and but two secondary manifold sections are used, as in Fig. 3, the reduced end portion 54 of section 44 is received in the enlarged end portion 56 of section 40, having an enlarged bore part 58 to receive the portion 56 of the other section. In this way the length of the secondary manifold can be varied as desired to suit the particular engine. One overall length for the secondary manifold is indicated in full lines in Fig. 3, and an increased length in dotted lines. The union between the sections is completed by screwing up the gland nut 60, suitable packing 62 having been inserted to make a tight joint.

Where additional nozzles and secondary manifold sections are required, as, for example, for the triple branched intake manifold of Figs. 1 and 2, an additional section 42 is provided having at one end a female connection, with a gland nut 60 to take the male union member of section 44, and having at the other end a male union member 64 to enter the female connection of the adjacent section 40. The sliding or telescoping adjustment to adapt the parts to differing center distances is made as before and as will be seen, the construction affords a wide range of adjustability. With the telescoping arrangement of the manifold parts, there is complete freedom from strains and leaks being caused by expansion and contraction due to heating and cooling. With use of light tubing, expansion and contraction leaks are unlikely, and with such construction welding may be resorted to in place of the gland nuts 60.

It will be apparent that the invention enables accessory installations to be expeditiously made on various engines by use of a small number of stock parts, which can be easily and simply manufactured and are readily assembled in whatever relation may be required and without cutting or machining work of any kind other than the drilling and tapping of the principal manifold.

My invention includes changes and modifications within the scope of the appended claims, by which I intend to cover all that is novel over the prior art.

I claim:

1. A secondary manifold made in telescoping sections, and means for locking the sections together in position adjusted for manifolds of different makes, each section provided with means for connecting to a principal manifold.

2. Secondary manifold for delivery of supplemental charge material to intake manifold of internal combustion engines comprising nozzle members for insertion into the intake manifold, and conduit sections connected to said nozzle members and having adjustable telescoping connection with one another, and means for locking said sections together in adjusted position and provide a fluid tight joint therebetween.

3. The combination with a plurality of nozzle members adapted to be inserted into the intake manifold of an internal combustion engine opposite the branches thereof and therefore at a spacing differing for different intake manifolds, of a secondary manifold made up of sections, one of said sections being adapted to be connected to each nozzle member, and telescoping connections between successive manifold sections.

4. The combination with a plurality of nozzle members adapted to be inserted into the intake manifold of an internal combustion engine opposite the branches thereof and therefore at a spacing differing for different intake manifolds, of a secondary manifold made up of sections, one of said sections being adapted to be connected to each nozzle member, and telescoping slip joint connections between successive manifold sections with gland nuts for locking and making a hermetically tight union between adjacent sections.

5. A secondary manifold for delivery of supplemental charge material to the principal intake manifold of an internal combustion engine having nozzle connections to such principal intake manifold substantially opposite the branches thereof, and made in telescopable parts, whereby such secondary manifold is adapted to be attached to intake manifolds of varying center distances between branches.

6. A secondary manifold for delivery of supplemental charge material to the principal intake manifold of an internal combustion engine, said secondary manifold having means for supply of supplemental gases at one end thereof and having nozzle connections to the principal intake manifold substantially opposite the branches thereof, said nozzle connections being of successively increasing aperture as their distances from the supply end increase, and said secondary manifold being made in telescopable parts, whereby same is adapted to be extended or contracted in length at will and attached to intake manifolds having varying center distances between the branches thereof.

7. The combination of a plurality of threaded nozzle members adapted to be secured in correspondingly threaded openings in the intake manifold opposite the branches thereof, with a conduit including sections adjustable axially relative to each other, means for locking said sections together in adjusted position, and means for securing said nozzles to said parts.

8. The combination of a plurality of telescoping tubular sections, means for locking said sections together in adjusted position, with a plurality of nozzle members for insertion into the intake manifold opposite the branches thereof; said sections and said nozzles having registering flanges, and means for securing the same together.

9. The combination of a plurality of telescoping tubular sections, with a plurality of separable nozzle members for insertion into the intake manifold opposite the branches thereof, means for securing a nozzle to each of said sections, and means for securing said sections in fluid tight relation to each other in the adjusted positions thereof.

10. A secondary manifold for delivery of supplemental charge material to the principal intake manifold of an internal combustion engine comprising means for supply of supplemental gases at one end thereof, and nozzle connections to the intake manifold substantially opposite the branches thereof, said nozzle connections being of successively increasing aperture as their distance from the supply end increases.

In testimony whereof, I have signed my name hereto.

ARLINGTON MOORE.